Dec. 17, 1935.   C. C. FARMER   2,024,632
FLUID PRESSURE BRAKE DEVICE
Filed Oct. 6, 1934
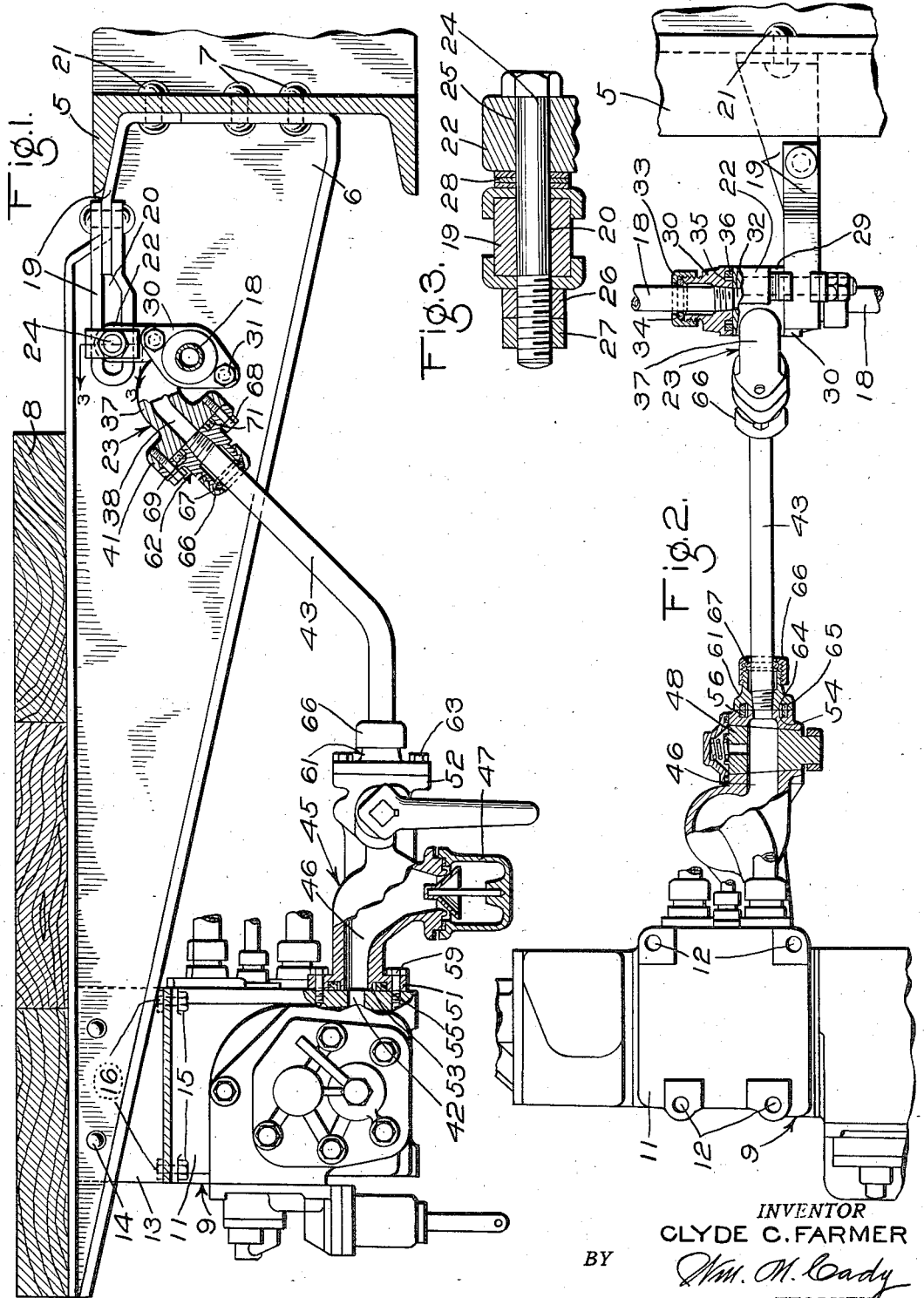
INVENTOR
CLYDE C. FARMER
BY *Wm. M. Cady*
ATTORNEY Patented Dec. 17, 1935

2,024,632

UNITED STATES PATENT OFFICE 2,024,632

FLUID PRESSURE BRAKE DEVICE

Clyde C. Farmer, Pittsburgh, Pa., assignor to The Westinghouse Air Brake Company, Wilmerding, Pa., a corporation of Pennsylvania Application October 6, 1934, Serial No. 747,171

4 Claims. (Cl. 303—1)

This invention relates to fluid pressure brake devices, particularly to the arrangement and construction of the branch pipe connection between the brake pipe and the brake controlling valve device, the present application being a continuation in part of my copending application, Serial No. 692,089, filed October 4, 1933, and assigned to the assignee of this application.

At the present time, the arrangement and disposition of the brake controlling valve device with respect to the brake pipe is such as to require a relatively long branch pipe connection between the brake pipe and inlet passage of the brake controlling valve device, a dirt-collector device and a cut-out valve device, each separately constituted, being supported in the branch pipe connection solely by threaded pipe joints. Such construction entails a relatively large number of threaded pipe joints and due to shocks and jars to which the cars are subjected, these pipe joints soon become loosened as a result of vibration and strain thereon so that leakage of fluid under pressure at the pipe joints soon develops.

If there is leakage of fluid under pressure at pipe joints in the brake pipe or in the branch pipe connection, a desired efficiency of operation in applying and releasing the brakes cannot be obtained, and it is necessary for the usual fluid compressor supplying fluid under pressure to the brake pipe system to operate unnecessarily in order to maintain the brake pipe pressure against such leakage. Furthermore, if there is leakage of fluid under pressure at pipe joints in the brake pipe or branch pipe connection, then when the brake valve is operated to apply the brakes by effecting a reduction in the brake pipe pressure, a greater reduction than desired will be caused, due to the additional reduction caused by leakage.

Also, if the branch pipe connection is relatively long, more fluid must be supplied to the brake pipe to build up a desired pressure than if the branch pipe connection is relatively short, and due to the time required for fluid under pressure to flow through the branch pipe connections, relatively long branch pipe connections delay the response of the brake controlling valve devices to variations in the pressure of the fluid in the brake pipe, particularly in a long train of cars.

It is, therefore, an object of my invention to prevent or reduce the possibility of the occurrence of leakage of fluid under pressure from the branch pipe connection of a fluid pressure brake system.

More specifically, it is an object of my invention to provide separable elements adapted, when secured together, to form a rigid connection between the brake pipe and the brake controlling valve device, which connection functions inherently to resist strains imposed thereon by shocks and jars to the car.

It is a further object of my invention to provide a branch pipe assembly adapted to shorten the length of the branch pipe passage to increase the speed of operation of the brakes, which assembly is also adapted to be readily and simply installed or removed without subjecting the assembly to strains or stresses.

The above and other objects of my invention which will be made apparent hereinafter are attained by means of the embodiment of my invention subsequently described and illustrated in the accompanying drawing, wherein, Figure 1 is an elevational view, partly in section, showing a portion of a car structure and, in relation thereto, the construction and arrangement of the branch pipe connection which I have devised, Figure 2 is a plan view corresponding to Figure 1, the car structure being omitted for clarity, and Figure 3 is an enlarged sectional view, taken on line 3—3 of Figure 1.

Referring to Figure 1, a fragment of a typical car structure is shown, comprising a longitudinally extending center sill or channel member 5, a pair of spaced triangular-shaped channel members 6, only one of which is shown, extending in perpendicular lateral relation to the longitudinally extending sill or channel member 5 and secured thereto, as by rivets 7 extending through the end flange on the channel member 6 and through the web of the channel member 5, and a plurality of floor boards 8 adapted to rest on the upper flange of the channel member 6 and to be secured thereto in any suitable manner.

Secured in depending relation, between the spaced channel members 6 and adjacent the outside extremity thereof, is a brake controlling valve device 9, having a casing 11 provided with a plurality of holes 12 in the upper face thereof. A channel member 13, disposed between the pair of channel members 6, has its opposite flanges secured respectively to the channel members 6, as by rivets 14, the web of the channel member 13 being provided with suitable holes registering with the holes 12 in the casing 11 of the brake controlling valve device 9, through which holes suitable bolts 15 are inserted which are provided with nuts 16 for rigidly securing the brake controlling valve device 9 to the car structure.

The brake pipe 18 which is supported from the car structure in any suitable manner at intervals along the length thereof, is rigidly secured against longitudinal displacement thereof, caused by shocks and jars to the car, by means of a bracket device 19 rigidly secured to the center sill 5 as by one or more rivets 21, to which bracket device an upstanding lug 22 on the brake pipe T 23 is secured, in the manner disclosed in my above mentioned copending application, Serial No. 692,089. The bracket device 19 has a slotted opening 20 therein, and a bolt 24 is inserted through a hole 25 in the upstanding lug of the T 23 and through the slotted opening 20, the bolt being provided with a suitable nut 26 and lock nut 27. A suitable number of spacers or washers 28 are disposed between the lug 22 and the bracket device 19, for a purpose hereinafter pointed out.

The branch pipe T 23 comprises a casing 29 having reinforced flanged union couplings 30 secured on opposite sides thereof, as by bolts 31 and nuts, not shown, the sections of the brake pipe 18 being threaded respectively thereinto in alignment with a through passage 32 in the casing 29. The flanged couplings 30 are provided with cylindrical extensions surrounding the brake pipe 18 and a union nut 33 is adapted to be screwed over the outer threaded surface of the cylindrical extension of the flanged couplings and to compress an annular spring member 34 against an inwardly tapered shoulder on the end of the cylindrical extension of the flanges to compress the spring member into metal-to-metal contact with the brake pipe to support or anchor the brake pipe at a point remote from the threaded joint. This type of coupling is in part similar to that disclosed in my Patent 1,520,705 assigned to the assignee of this application.

The faces of the flanged couplings 30 are provided with annular grooves 35 therein, which surround the threaded joints of the brake pipe in the flanged couplings, each groove having an annular sealing gasket 36 disposed therein, adapted to be compressed into, but not to completely fill the groove when the face of the flanged couplings and that of the casing 29 of the pipe T 23 engage in metal-to-metal contact. Long life of the gaskets is thus secured since the flow of gasket material in the groove is not confined or restricted. This type of seal is disclosed in Patent No. 1,956,683, to E. E. Hewitt, assigned to the assignee of this application.

The branch pipe portion 37 of the T 23 is so constructed that a passage 38 therein, opening into the passage 32 in the casing 29 of the T, curves upwardly from the passage 32 and then downwardly to open at the face of a flange 41 with which the branch pipe portion 37 terminates, the flange 41 facing downwardly at an angle to the vertical. The curved construction of the passage 38 is for the purpose of preventing, as much as is possible, the entry of dirt or dust particles from the brake pipe into the branch pipe connection, the weight of the dust or dirt particles causing them to fall back into the brake pipe instead of passing upwardly into the branch pipe passage with the air.

The connection between passage 38 in the branch pipe T 23 and the fluid inlet passage 42 for the brake controlling valve device 9 opening at the face of the casing 11, is established, according to my invention, by means of a length of pipe 43 bent through an angle in one plane, and a casing member 45 having a passage 46 therethrough, in which casing member 45 are embodied a dirt-collector device 47 and a cut-out valve device 48, a reduction in the length of the branch pipe connection being facilitated and a reduction in the number of pipe joints being effected, by embodying the dirt-collector device and cut-out valve device in a single casing.

The casing member 45 is provided at opposite ends thereof with flanges 51 and 52 respectively, the flanges having annular grooves 53 and 54, respectively, formed or cut in the face thereof, and surrounding the openings of the passage 46. Annular sealing gaskets 55 and 56 are disposed in the annular grooves 53 and 54, respectively, which gaskets are adapted, similarly to the gaskets 36 in the faces of the flanged couplings 30 secured to the pipe T 23, to be compressed into the grooves 53 and 54 by an abutting face member but not to completely fill the groove.

The casing member 45 is rigidly secured to the casing 11 of the brake controlling valve device 9, by means of bolts or screws 59 which pass through suitable openings in the flange 51 and engage tapped holes in the casing 11, the gasket 55 being compressed into the groove 53 and sealing the metal-to-metal joint of the flange 51 and casing 11 against leakage of fluid under pressure.

The pipe 43 is threaded at opposite ends thereof into reinforced flanged union couplings 61 and 62, respectively, which couplings are similar to the reinforced flanged couplings 30 on the brake pipe T 23. The flange of the coupling 61 is adapted to be securely fastened to the flange 52 of the casing member 45 by means of bolts or screws 63, the face of the flange of coupling 61 being provided with an annular groove 64 having an annular sealing gasket 65 disposed therein in registration with the sealing gasket 56 in the face of the flange 52, so that the gaskets 56 and 65 are mutually compressed when the flanges engage in metal-to-metal contact.

The flange of the coupling 62 is adapted to be securely fastened to the flange 41 of the brake pipe T 23 by means of suitable bolts or screws 68, the face of the flange of coupling 62 being provided with an annular groove 69 in which an annular sealing gasket 71 is disposed, which gasket is compressed into the groove 69 but which does not completely fill the groove when the flanges engage in metal-to-metal contact.

Each of the flanged couplings 61 and 62 is adapted to reinforce the threaded joints of the pipe 43 therein by having a cylindrical extension surrounding the pipe, which extension is externally threaded to receive a union nut 66 which compresses an annular spring member 67 against the inwardly tapered end of the cylindrical extension and into metal-to-metal contact with the pipe 43.

In establishing or assembling the brake pipe connection, the casing member 45 and the pipe 43 may first be joined together in a position removed from the car, thus permitting pipe 43 to be rigidly secured to the casing member 45 in a relatively simple and easy manner. The casing member 45 may then be secured to the casing 11 of the brake controlling valve device 9. After the casing member 45 and the pipe 43 are secured to the casing 11 of the brake controlling valve device 9, the brake pipe 18 may be loosely mounted with the brake pipe T 23 therein in substantial alignment with the flanged coupling 62 on the end of the pipe 43. The brake pipe T 23 and the brake pipe 18, are then adjusted into position, so that the flange 41 of the brake pipe T engages the flange of the flanged coupling 62 in metal-to-metal contact with the holes in the respective flanges in exact registry, the brake pipe T 23 then being secured to the flanged coupling 62 on the pipe 43 by means of the bolts or screws 68.

The bracket device 19 is secured in such position that there is always a minimum spacing between the lug 22 on the brake pipe T and the bracket device 19 to allow for assembly variations. If the slot 29 in the bracket device is not in alignment with the hole 25 in the lug 22 on the brake pipe T, the bracket device 19 is bent upwardly or downwardly as required, until the necessary alignment is secured. The space between the lug 22 and the bracket device 19 is then filled with a suitable number of spacers or washers 28, so that when the bolt 24 is subsequently inserted through the hole 25, through the washers 28 and through the slot 29, and the nuts 26 and 27 drawn tightly up thereon, no longitudinal force or strain is exerted tending to move the brake pipe longitudinally. As a result, no strain is placed on any of the metal-to-metal contact butting joints previously established. After the brake pipe is thus secured against longitudinal displacement by the bracket device 19, the other clamping devices of usual construction at other points along the length of the brake pipe on the car may be tightened and drawn up to securely and rigidly fasten the brake pipe to the car structure.

If it is desired to remove the branch pipe connection for repair or replacement, the usual bracket supports along the length of the brake pipe are loosened and then the bolts 68 securing the flange 41 of the brake pipe T 23 to the flange of the coupling 62 may be removed, and the nuts 26 and 27 loosened sufficiently on the bolt 24, to permit the brake pipe T to be moved inwardly in the slot 29 of the bracket device 19. Thus the brake pipe T 23 may be moved away from the coupling 62, so that after the removal of bolts 59, securing the flange 51 of the casing member 45 to the casing 11 of the brake controlling valve device 9, the entire branch pipe connection may be removed in a simple manner without any strain being placed on the brake pipe or on the bolts 15 securing the brake controlling valve device casing 11 to the car structure.

It will, therefore, be seen that I have provided a novel arrangement and construction for a branch pipe connection between a brake pipe and a brake controlling valve device of a fluid pressure brake system, the branch pipe connection comprising a plurality of separable elements adapted to be joined together, as well as to the brake controlling valve device casing and to the brake pipe, in rigid butting metal-to-metal relation to inherently resist strains caused by shocks and jars and tending to cause leakage of fluid under pressure at the points of joinder.

It will also be seen that I have provided an assembly of parts in a branch pipe connection which enables the length of the passage to be appreciably shortened, whereby less fluid is required to be supplied to the brake pipe to build up a desired pressure, and whereby the retardation to a pressure increase or pressure reduction wave in the brake pipe is reduced.

It will further be seen, that I have provided such an arrangement and construction as to permit the assembly or disassembly of a rigid branch pipe connection without imposing strains on the connection while it is being secured in position or removed from position.

By means of the construction and arrangement of the elements for establishing a branch pipe connection, which I have devised, relatively no leakage of fluid under pressure from the fluid pressure system can occur in the branch pipe connection, despite severe shocks and jars to the equipment. A more effective and efficient operation of the brake system is thus possible and less operation of the fluid compressor supplying fluid under pressure to the fluid pressure system is necessitated. Wear and cost of maintenance of the fluid compressor and its driving engine is, therefore, minimized.

While I have disclosed but one embodiment of my invention, it will be apparent that various changes, omissions or additions may be made therein without departing from the spirit thereof. It is not my intention, therefore, to place any limitations on the scope of my invention, except as required by the prior art and as defined in the appended claims.

Having now described my invention, what I claim as new and desire to secure by Letters Patent, is:

1. The combination with a brake controlilng valve device having a casing, a brake pipe, and a brake pipe T in said brake pipe having a casing, of a rigid structure providing a passage for the flow of fluid between the brake pipe and the brake controlling valve device, said rigid structure comprising a rigid casing member embodying a dirt-collector device and a cut-out valve device and terminating at each end in a flange, a piece of pipe externally threaded at both ends, a flanged coupling for each end of said pipe and having a threaded bore therein for receiving the threaded end of the pipe, said flanged couplings being adapted to support the said pipe against lateral strains on the threaded joints at a point removed from the threaded joints, one flange of the rigid casing member and the flanged coupling at one end of the piece of pipe being rigidly secured together in sealed metal-to-metal contact, the other flange of the rigid casing member and the flanged coupling at the other end of the said piece of pipe being rigidly secured in sealed metal-to-metal contact with the casing of the brake controlling valve and the casing of the brake pipe T, respectively.

2. The combination with a brake pipe and a brake controlling valve device having a casing rigidly secured to a car structure, of two separable elements adapted to be rigidly secured together in sealed face-to-face butting relation, one of said separable elements being also adapted to be rigidly secured in sealed face-to-face butting relation with the casing of said brake controlling valve device, a brake pipe T having a flange adapted to be secured in sealed face-to-face butting contact relation with the other of said separable elements, and means adapted to rigidly secure said brake pipe T to the car structure to resist longitudinal displacement of the brake pipe.

3. The combination with a brake pipe and a brake controlling valve device having a casing rigidly secured to a car structure, of two separable elements adapted to be rigidly secured together in sealed face-to-face butting relation, one of said separable elements being also adapted to be rigidly secured in sealed face-to-face butting relation with the casing of said brake controlling valve device, a brake pipe T having a flange adapted to be secured in sealed face-to-face butting contact relation with the other of said separable elements, and adjustable means adapted to rigidly secure said brake pipe T to the car structure to resist longitudinal displacement of the brake pipe.

4. The combination with a brake pipe and a brake controlling valve device having a casing rigidly secured to a car structure, of two separable elements adapted to be rigidly secured together in sealed butting metal-to-metal relation, one of said separable elements being also adapted to be rigidly secured in sealed butting metal-to-metal relation with the casing of said brake controlling valve device, a brake pipe T having a projecting lug and a flange, the flange of the said brake pipe T being adapted to be secured in sealed butting metal-to-metal contact relation with the other of said separable elements, and means for rigidly securing the brake pipe T to the car structure without imposing any strain on the sealed butting metal-to-metal joints, said means including a support rigidly secured to the car structure in longitudinally spaced relation to the lug on said brake pipe T, rigid spacer means adapted to be interposed between said support and the lug on said brake pipe T in such manner as to maintain the spaced relationship of the brake pipe T relative to the said support, and means for securing the lug on said brake pipe T, the said spacer means and the said support together.

CLYDE C. FARMER.